United States Patent
Vargo et al.

(10) Patent No.: US 7,963,018 B2
(45) Date of Patent: Jun. 21, 2011

(54) TIRE BEAD SEPARATION METHOD AND DEVICE

(75) Inventors: Richard David Vargo, Cuyahoga Falls, OH (US); Gary Robert Burg, Massillon, OH (US); Daniel Michael Spallone, Lyndhurst, OH (US); Brian Richard Koch, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 929 days.

(21) Appl. No.: 11/867,353

(22) Filed: Oct. 4, 2007

(65) Prior Publication Data

US 2009/0089992 A1   Apr. 9, 2009

(51) Int. Cl.
   *B23P 19/00*   (2006.01)
(52) U.S. Cl. ............. 29/426.5; 29/426.6; 72/58; 72/63; 156/131; 156/136
(58) Field of Classification Search .......... 29/426.5, 29/239, 252, 282, 426.1, 426.6; 156/131, 156/136, 422, 403; 72/58, 63; 254/93 HP
   See application file for complete search history.

(56) References Cited

U.S. PATENT DOCUMENTS

| | | | | | |
|---|---|---|---|---|---|
| 4,113,828 | A | * | 9/1978 | Kramer et al. ............. | 264/294 |
| 4,369,086 | A | * | 1/1983 | Nakahama et al. ......... | 156/403 |
| 4,581,084 | A | * | 4/1986 | Mukae et al. .............. | 156/131 |
| 4,614,268 | A | * | 9/1986 | Chlebina et al. ........... | 206/304 |
| 5,225,016 | A | * | 7/1993 | Sarh ........................... | 156/156 |
| 5,232,202 | A | * | 8/1993 | Watson ....................... | 254/1 |
| 5,262,115 | A | * | 11/1993 | Tomlinson .................. | 264/265 |
| 5,397,103 | A | * | 3/1995 | Watson ....................... | 254/1 |
| 5,433,815 | A | * | 7/1995 | Aihara et al. ............... | 156/403 |
| 7,314,065 | B1 | * | 1/2008 | Adelman et al. ........... | 138/89 |
| 7,389,822 | B2 | * | 6/2008 | Lohbeck et al. ............ | 166/384 |
| 7,601,407 | B2 | * | 10/2009 | Irvine .......................... | 428/20 |
| 7,861,744 | B2 | * | 1/2011 | Fly et al. ..................... | 138/98 |
| 2002/0036045 | A1 | | 3/2002 | Volpi .......................... | 152/526 |
| 2002/0124925 | A1 | * | 9/2002 | Caretta et al. .............. | 152/415 |
| 2009/0089992 | A1 | * | 4/2009 | Vargo et al. ................ | 29/426.6 |

FOREIGN PATENT DOCUMENTS

| | | |
|---|---|---|
| DE | 41 06 426 | 2/1992 |
| EP | 0 567 652 | 11/1993 |
| JP | 2002 011807 | 1/2002 |
| JP | 2005 299809 | 10/2005 |

OTHER PUBLICATIONS

Patent Abstracts of Japan, Publication No. 2002011807 dated Jan. 15, 2002.
Patent Abstracts of Japan, Publication No. 2005299809 dated Oct. 27, 2005.

* cited by examiner

*Primary Examiner* — David P Bryant
*Assistant Examiner* — Bayan Salone
(74) *Attorney, Agent, or Firm* — June E. Rickey

(57) ABSTRACT

A method and apparatus is provided for separating two or more annular members such as bead assemblies or bead and apex assemblies. First, a flexible member is inserted into the annulus of the annular members. Next, the flexible member is inflated until the outer surface of the flexible member contacts the inner diameter of the annular member. Then the flexible member is axially expanded until the annular members are separated. Then the flexible member is deflated so that the annular members can be removed.

3 Claims, 2 Drawing Sheets

US 7,963,018 B2

TIRE BEAD SEPARATION METHOD AND DEVICE

FIELD OF THE INVENTION

The present invention relates to tire building machinery, and more particularly, to the handling of tire bead components prior to assembly into the tire.

BACKGROUND OF THE INVENTION

As illustrated in FIG. 1, pneumatic tires T have two annular beads B, composed of a core or bundle of metal wires formed in the shape of a ring. The annular beads are arranged in a bead portion 100 at each of the left and right sides of the tire. Tire manufacturers sometimes join an annular apex or bead filler Bf to the bead core prior to assembly into a tire. The apex or bead filler Bf is typically comprised of a hard rubber that is arranged about the outer periphery of the bead core.

Prior to tire assembly, the bead core assemblies Bc or the preassembled bead and apex assemblies B are typically stacked together in the unvulcanized condition. In the stacked state, the assemblies tend to undergo adhesion to one another, making it extremely difficult to separate the assemblies from one another without damaging them. Separating the beads manually or by machine may result in damage to the assemblies such as pulling rubber from the wires, bending the wires or even separating the wires from the assembly.

SUMMARY OF THE INVENTION

The invention provides a method and apparatus of separating two or more annular members, the method comprising the steps of: inserting a flexible member into the annulus of the annular members. Next, the flexible member is inflated until the outer surface of the flexible member contacts the inner diameter of the annular member. Then the flexible member is axially expanded until the annular members are separated; finally, the flexible member is partially deflated so that the annular member can be removed.

DEFINITIONS

"Aspect Ratio" means the ratio of a tire's section height to its section width.

"Axial" and "axially" mean the lines or directions that are parallel to the axis of rotation of the tire.

"Bead" or "Bead Core" mean generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" mean at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers "Breakers" or "Tire Breakers" mean the same as belt or belt structure or reinforcement belts.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated, radially deployed or otherwise parallel cords.

"Radial" and "radially" mean directions radially toward or away from the axis of rotation of the tire.

"Radial Ply Structure" means the one or more carcass plies of which at least one ply has reinforcing cords oriented at an angle of between 65° and 90° with respect to the equatorial plane of the tire.

BRIEF DESCRIPTION OF THE DRAWINGS

The invention will be described by way of example and with reference to the accompanying drawings in which.

DETAILED DESCRIPTION OF THE INVENTION

Figure 1:
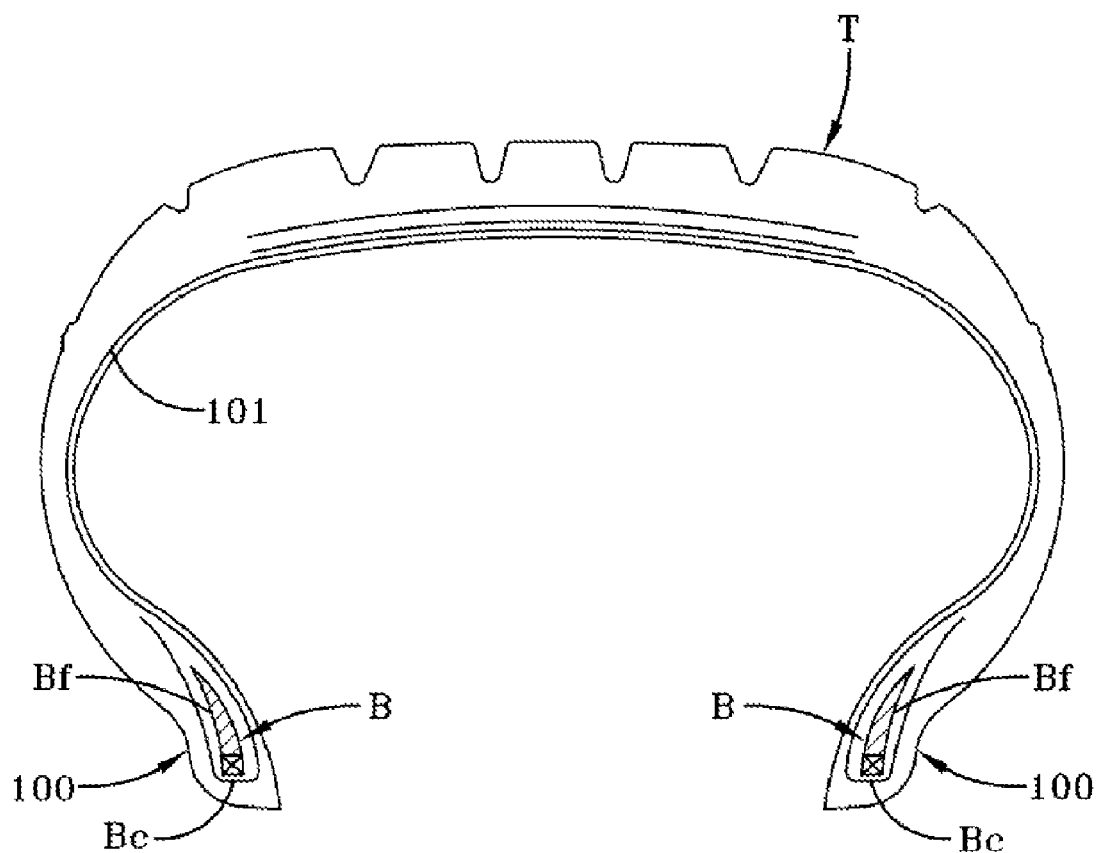
FIG. 1 is a prior art drawing of an exemplary tire.
Figure 2:
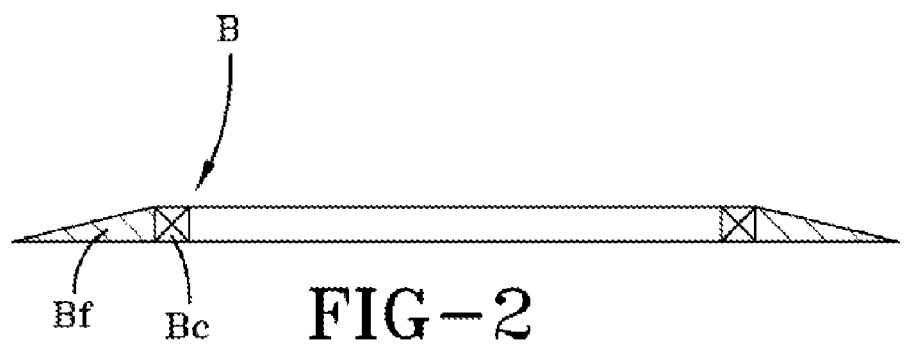
FIG. 2 is a prior art drawing of a prior art bead and apex assembly.
Figure 6:
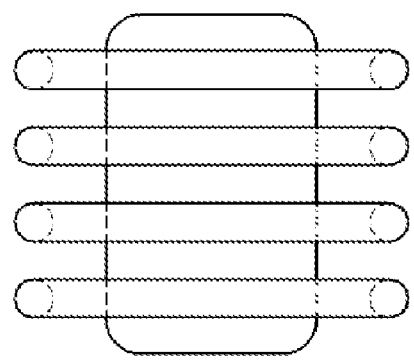
FIG. 6 is a view of the invention shown in the decoupled and partially deflated position.
Figure 5:
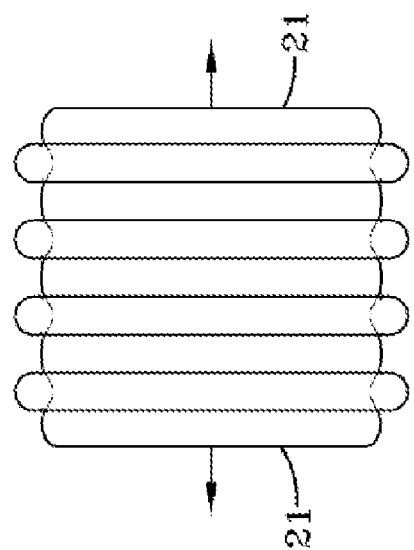
FIG. 5 is a view of the invention shown in the inflated and expanded position.
Figure 4:
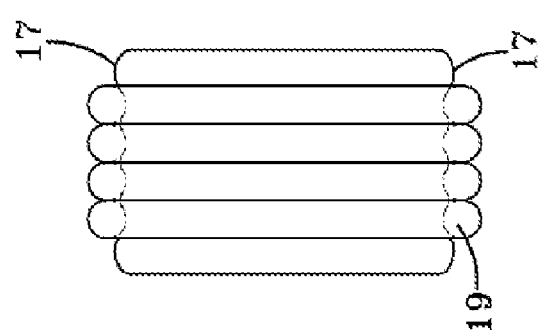
FIG. 4 is a view of the invention shown in the inflated position.
Figure 3:
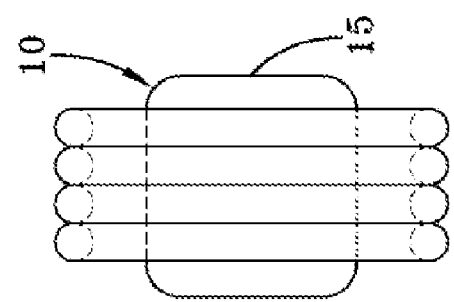
FIG. 3 is an illustration of a first embodiment of the invention.

FIG. 3 illustrates a first embodiment of a separator apparatus 10 of the invention. The bead separator 10 may be used to separate stacked annular components such as annular beads, annular bead and apex assemblies or other stacked components which may or may not be circular in cross-section. The invention is thus not limited to these bead assemblies, and may be utilized to separate other annular components as well, including those annular components unrelated to tire building. The separator apparatus 10 comprises an expansion chamber 15 which may typically be circular in cross-section or any other desired cross-sectional shape which mates with the components to be separated. The expansion chamber 15 may be comprised of rubber or other expandable material. The expansion chamber 15 initially has a smaller diameter than the inner diameter of the beads or other annular component to be separated. The expansion chamber is inserted through the inner diameter of the components to be separated. Next, the expansion chamber is inflated until the outer walls 17 of the expansion chamber contact the inner diameter 19 of the annular components to be separated. See FIG. 4. Next, one or both of the opposed ends 21 of the expansion chamber are pulled away from the other respective end by an external force. The external force may be exerted manually or by a machine (not shown). The opposed ends of the expansion chamber may optionally comprise handles to assist in manually exerting the axial forces necessary to pull the opposed ends 21 apart. As the force is exerted on the expansion chamber, the bead assemblies are separated from each other. It is preferred that the separation occur at about constant diameter of the expansion chamber. Thus the internal pressure of the expansion chamber may be monitored and increased in order to maintain the diameter during the separation. Next, as shown in FIG. 6, the rubber cylinder is deflated until the bead assemblies can be removed.

Thus an improved method and apparatus is provided to separate two or more annular members that have adhered to each other due to the stickiness of the outer surfaces. The apparatus and method provide a simple, cost effective solution for separating the annular members without requiring excessive force that often results in the damaging of the members. Further, the invention provides equal gripping force on beads if they are stacked nonuniformly (e.g., not in axial alignment) due to the elastomeric nature of the bead separator.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of separating two or more annular members, said annular members being stacked and adhered together, the method comprising the steps of: inserting a flexible member into the annulus of the annular members; inflating the flexible member until the outer surface of the flexible member contacts the inner diameter of the annular members; axially expanding the flexible member until the annular members are separated; and deflating the flexible member so that the annular members can be removed.

2. The method of claim 1 wherein the flexible member is made of rubber.

3. The method of claim 1 wherein the flexible member is cylindrical in shape.

\* \* \* \* \*